(12) United States Patent
Melahn et al.

(10) Patent No.: US 6,948,163 B2
(45) Date of Patent: Sep. 20, 2005

(54) REMOTE ELECTRONIC FILE BUILDER

(75) Inventors: Gregory T. Melahn, Cary, NC (US); Timothy S. Orlowski, Hillsborough, NC (US)

(73) Assignee: International Business Machines Corporation, Armonk, NY (US)

(*) Notice: Subject to any disclaimer, the term of this patent is extended or adjusted under 35 U.S.C. 154(b) by 654 days.

(21) Appl. No.: 10/059,595

(22) Filed: Jan. 29, 2002

(65) Prior Publication Data

US 2003/0145306 A1 Jul. 31, 2003

(51) Int. Cl.[7] .................................................. G06F 9/44
(52) U.S. Cl. ...................................... 717/168; 707/203
(58) Field of Search ................................ 717/168–173; 707/203; 715/511

(56) References Cited

U.S. PATENT DOCUMENTS

| | | | | |
|---|---|---|---|---|
| 5,339,435 | A | | 8/1994 | Lubkin et al. ............... 717/121 |
| 5,495,610 | A | | 2/1996 | Shing et al. ................ 709/221 |
| 5,956,513 | A | | 9/1999 | McLain, Jr. ................ 717/142 |
| 6,029,178 | A | * | 2/2000 | Martin et al. ............... 707/201 |
| 6,216,140 | B1 | * | 4/2001 | Kramer ...................... 717/169 |
| 6,553,391 | B1 | * | 4/2003 | Goldring et al. ............ 707/203 |
| 6,625,626 | B1 | * | 9/2003 | Haneda ...................... 707/205 |
| 6,668,264 | B1 | * | 12/2003 | Patterson et al. ........... 707/205 |
| 6,721,742 | B1 | * | 4/2004 | Uceda-Sosa et al. .......... 707/10 |
| 6,745,209 | B2 | * | 6/2004 | Holenstein et al. ......... 707/203 |

OTHER PUBLICATIONS

Ambriola et al. The Evolution of Configuration Management and Version Control. Software Engineering Journal. 1990. pp. 303–310.*

Hardwick et al. Concurrent Engineering with Delta Files. IEEE. 1995. pp. 62–68.*

Jai. RADIUS: Rapid Application Delivery, Installation, and Upgrade System. pp. 180–186.*

Versioning Extensions to WebDAV (Internet Draft), by Clemm et al., dated Oct. 2, 2001, available at http://www.ietf.org/internet-drafts/draft-ietf-deltav-versioning-20.txt on Jan. 8, 2002.

World Wide Web Distributed Authoring and Versioning (WebDAV): An Introduction, by E. James Whitehead, Jr., pp. 3–8, Standard View, vol. 5, No. 1, dated Mar. 1997.

Web Versioning Model, WebDAV Working Group (Internet Draft), by Jim Amsden and Geoff Clemm, pp. 1–25, dated Feb. 9, 1999.

* cited by examiner

Primary Examiner—Wei Y. Zhen
(74) Attorney, Agent, or Firm—Synnestvedt & Lechner LLP; Martin L. McKinley (57) ABSTRACT

A method for remotely building electronic files, and a system and product for performing the method. The method includes determining if a repository target file is up-to-date with respect to a repository source file; and if the repository target file is not up-to-date, identifying as a build source a source file that matches the repository source file and building an updated build target file at the host based on the build source file. Build requests can be received and build reports can be displayed over the Web. In addition, the method, system, and product support versioning.

15 Claims, 6 Drawing Sheets

REMOTE ELECTRONIC FILE BUILDER

FIELD OF THE INVENTION

The present invention relates to building files and, more particularly, to building files from a remote repository at a host.

BACKGROUND OF THE INVENTION

Figure 1:
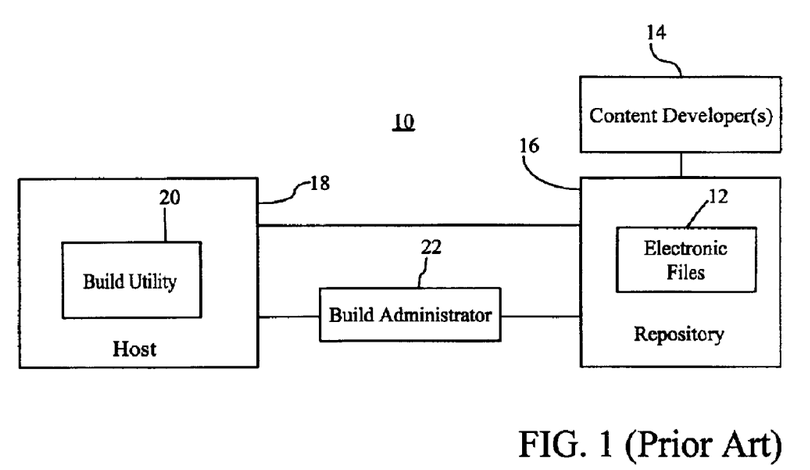
FIG. 1 is a block diagram of a prior art distributed programming environment.

FIG. 1 is a block diagram of a typical programming environment 10. Generally, electronic files 12 are deposited into a repository 16, i.e., a host computer for storing electronic files. The electronic files 12 may be created by one or more content developers 14, e.g., software programmers.

The electronic files 12 stored in the repository 16 are typically "source files" and "target files." One or more source files (e.g., files written in source code) may be converted to a target file (e.g., an executable file) that is based on the source files using known software programs such as a compiler. The process of converting the source files to the target file is referred to as "building." The target file is then tested, and if problems are found, then the source files are changed to correct the problems, and then a new target file is built based on the modified source files. Once the target file functions as desired, it can be distributed to end users.

Presently, in order to build the target file from the source files, a build utility 20 such as a "make utility" is used. A make utility is a software tool for managing and maintaining computer programs. The make utility utilizes a makefile, which is created by the content developers 14 and stored in the repository 16, to identify source files on which the target file depends. When the make utility is run, the make utility rebuilds the target file only if one or more of the source files on which it depends has been changed since the last time the target file was built, thereby saving build time.

In determining when the source files and target file were last updated, the make utility relies on build indicators for the source files and the target file that identify the date and time they were last modified. A "source build indicator" represents the date and time a source file was created or last modified and a "target build indicator" represents the date and time the target file was built. If the target file has a target build indicator that indicates that it was built after the last modification of every source file on which it depends, a build will not be performed since the resulting target file will be based on the same source files as the existing target file and would, therefore, result in an identical target file. On the other hand, if a source file has been modified since the last build of the target file, the target file will be rebuilt.

To build a target file from source files in the typical programming environment 10, the electronic files 12 residing in the repository 16 (including the source files, the target file, and the makefile) are transferred to the host 18 in response to a build request received from a content developer 12, for example. If one or more of the source files have been updated since the last time the target file was built, a build utility 20 at the host 18 utilizes build tools (e.g., a compiler) residing on the host 18 to build a target file from the transferred source files on which the target file depends. This method of building a target file is inefficient.

Inefficiencies arise in the described build process because the target file, all the source files on which the target file depends, and the makefile are transferred from the repository 16 to the host 18 every time a build is requested, even if some or most of the source files have not changed or are already available at the host 18, and even if a build is not required. This is especially problematic when multiple content developers 12 are involved. For example, assume a system having three source files used to build a target file. In addition, assume a first programmer ("X") updates a first source file and a second programmer ("Y") updates a second source file, and, then, X requests a build followed by Y requesting a build. When X requests the build, all three source files (and the existing target file and the makefile) are transferred to the host 18, including the source files as updated by X and Y, and a new target file is built from these source files if one or more of them were updated since the last time the existing target file was built. When Y requests the build after X, the process of transferring the source files (and the target file and the makefile) to the host 18 occurs again. This transfer is redundant since the same files are already at the host 18.

Accordingly, there is a need for methods, systems, and products for remotely building electronic files that are more efficient. The present invention fulfills this needs among others.

SUMMARY OF THE INVENTION

The present invention provides a method of remotely building electronic files. The method overcomes the aforementioned problem by determining if a target file at the repository is up-to-date with respect to a source file at the repository and only transferring the source file to perform a build at a host if the target file is not up-to-date. Accordingly, a source file is transferred and a new build is performed only if necessary, thereby increasing efficiency. The determination of whether the repository target file is up-to-date is based on the build indicators associated with the source file and the target file on the host and the repository. In addition, build requests may be received from content developers via the Web and build results may be stored in a Web accessible format for viewing by the content developers, thereby making the build process more user friendly. Also, information regarding the version of the source and target files may be utilized during processing to allow multiple versions of the files to be handled substantially simultaneously without interfering with one another.

One aspect of the present invention is a method for building a file at a host. The method includes determining if a repository target file is up-to-date with respect to a repository source file; and if the repository target build indicator is not up-to-date, identifying a build source that matches the repository source and building an updated build target at the host based on the build source.

In addition, the present invention encompasses a system and computer program product for carrying out the inventive method.

DETAILED DESCRIPTION OF THE INVENTION

Figure 2:
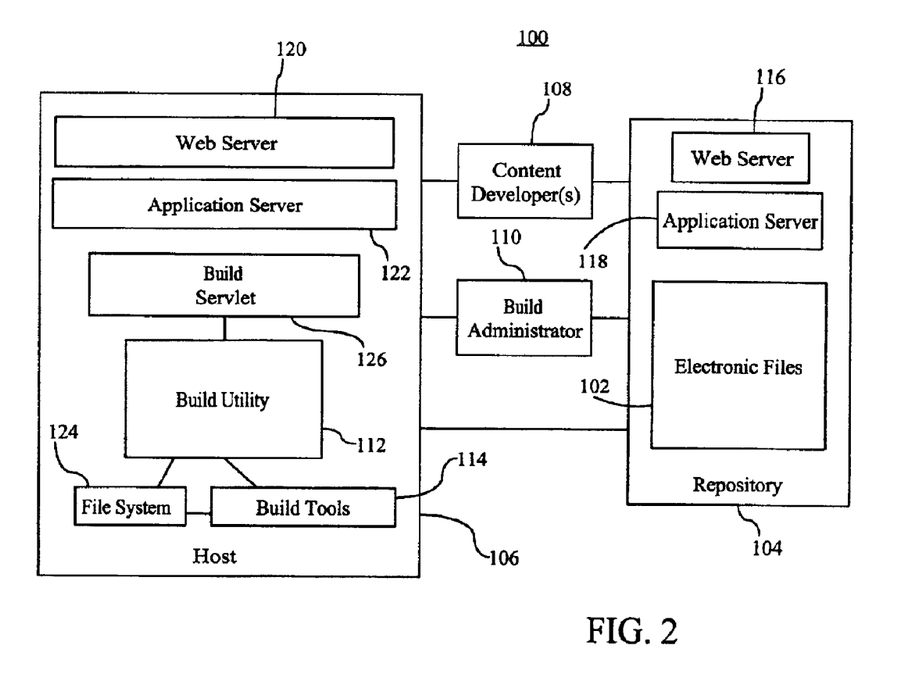
FIG. 2 is a block diagram of an embodiment of a distributed programming environment in accordance with the present invention.

FIG. 2 is a block diagram illustrating an exemplary environment 100 for remotely building a target file from a source file, which are stored as electronic files 102 in a repository 104, in accordance with the present invention. The target file is built from the source file using a build utility 112 residing on a host 106. The present invention is particularly useful, although not exclusively so, for remotely building a target file from one or more source files deposited in the repository 104 by a plurality of geographically dispersed content developers 108.

In a general overview, a build administrator 110 configures the repository 104 and the host 106 to facilitate building a target file at the host 106 from source files deposited into the repository 104 by the content developers 108. A build request to build a specific file, e.g., a target file, initiated by a content developer 108, for example, is received at the host 106, which invokes the build utility 112. The build utility 112 builds an updated build target from the source files using known build tools 114, and develops a build report that may be stored in a file system 124 for viewing by the content developer(s) 108, for example.

For descriptive purposes, it is assumed that a target file will be built from one source file. However, a target file may be built from a plurality of source files. The extension of the detailed description to cover the building of a target file using a plurality of source files will be apparent to those skilled in the art.

In accordance with the present invention, the build utility 112 utilizes build indicators (described below), such as a time stamp, which can be used to identify if one electronic file is "up-to-date" with respect to another. Specifically, the build indicator of a source file in the repository 104 is compared with the build indicator of an already-built target file in the repository 104. If the comparison indicates that the use of the source file will result in the building of a target file that is identical to the already-built target file, there is no need to perform a build operation. Accordingly, the source file will not be transferred to the host 106 and a build will not be performed, thereby yielding greater efficiency by reducing demand for system resources at the host 106 and network traffic between the repository 104 and the host 106.

This can be accomplished because analyzing the build indicators for the already-built target file and the source file identifies if the source file was used to create the already-built target file. Thus, once the build indicator of the already-built target file is examined, analysis of the build indicator for the source file in the repository 106 allows this determination to be made. If the repository source file is the same one used to build the already-build target file, the build process is not performed; if it is different, the build process is performed using the repository source file or an equivalent file stored on the host 106. The exemplary environment 100 will now be described in greater detail.

The repository 104 is a host computer that provides a centralized location for storing electronic files 102, such as the source file and the target file. The electronic files 102 may contain files for creating applications, documentation, objects, or essentially any files that may be built or used in the build process. In the illustrated embodiment, the repository 104 includes a Web server 116 and an application server 118, which enable communication over the World Wide Web (Web). The Web server 116 and application server 118 may be conventional servers, which are well known in the art. The repository 104 can be essentially any processing device (described below) that can store files and run an application server.

In addition, the repository 104 may be configured to support "versioning." Versioning is a concept wherein different versions of a file may be maintained simultaneously, allowing different users to work on different versions of a file without interfering with each other. In one embodiment, versioning is implemented according to the WebDAV protocol using known WebDAV servlets, for example. WebDAV (World Wide Web Distributed Authoring and Versioning) is an Internet Engineering Task Force (IETF) standard for collaborative authoring on the Web. WebDAV adds extensions to the Hypertext Transfer Protocol (HTTP) that facilitate collaborative editing and file management between users located remotely from each other on the Web. A description of versioning in accordance with the WebDAV protocol is contained in Versioning Extensions to WebDAV (Internet Draft), by Clemm et al., dated Oct. 2, 2001, incorporated fully herein by reference.

The host 106 provides an operating environment in which build requests may be received, builds performed, and results developed. In the illustrated embodiment, the host 106 includes a Web server 120 and an application server 122, which enable communication over the Web. In addition, in the illustrated embodiment, a build utility 112, a build servlet 126, build tools 114, and a file system 124 reside on the host 106. The host 106 can be essentially any processing device, such as described above in reference to the repository 104.

The build utility 112 controls the build process. In a preferred embodiment, the build utility 112 is an executable program that may be configured to perform the steps described below in reference to FIGS. 3A and 3B. In certain embodiments, a build servlet 126 provides an interface between the application server 122 and the build utility 112, thereby allowing the build utility 112 to communicate via the Web with the repository 104, content developers 108, and the build administrator 110. For example, the build utility 112 may be invoked through communication signals received from a content developer 108 via the Web and the build utility 112 may request the source file and target file (and associated information) from the repository 104 via the Web.

The build utility 112 is also coupled to the build tools 114, which are used to build the target. The build tools 114 may include well known compilers to build the target file. In addition, the build utility 112 is coupled to the file system 124 so that build reports generated by the build utility 112 may be placed on the file system 124. Files stored in the file system 124 may be available over the Web through the Web server 120 and the application server 122.

In certain preferred embodiments, the build utility 112 is configured to use the WebDAV protocol, which supports versioning. If the build utility 112 uses versioning, a separate file may be maintained on the host 106 to track information, such as version indicators, that are not supported by conventional file systems 124. The development of a suitable file for tracking WebDAV information will be readily apparent to those skilled in the art.

The content developers 108 develop and/or modify source files and deposit them in the repository 104. The source files may be deposited into the repository 104 using a protocol that supports file transfer, such as file transfer protocol (FTP), hypertext transfer protocol (HTTP), or WevDAV. In certain embodiments, the content developers 108 access the host 106 over the Web using conventional Web browsers. Using Web browsers, the content developers 108 may generate build requests that invoke the build utility 112 on the host 106 and view build results available in the file system 124 over the Web. The content developers 108 may be geographically dispersed. For example, one content developer may be located in the United States and another content developer may be located in Japan.

The build administrator 110 configures the repository 104 and the host 106 to facilitate building a target file at the host 106 using a source file from the repository 104. The build administrator 110 provides the repository 104 and the host 106 with information necessary to track the source and target files and transfer them between the repository 104 and the host 106, such as where the source file will be stored in the file system 124 when it is transferred to the host 106. In addition, the build administrator 110 may configure the repository 104 and the host 106 to allow access by specified content developers 108 only and limit the commands that the content developers 108 may use. For example, the content developers may be blocked from using the "Format" command, which could be used to erase all data on the host 106. Necessary information required to facilitate the build will be readily apparent to those skilled in the art. In one embodiment, the build administrator 110 configures a host administration servlet residing on the host 106 via the Web using a conventional Web browser. For example, the build administrator 110 may direct where source files received from the repository 104 at the host 106 will be stored in the file system 124 by appropriately configuring the host administration servlet through a Web browser.

Figure 3A:
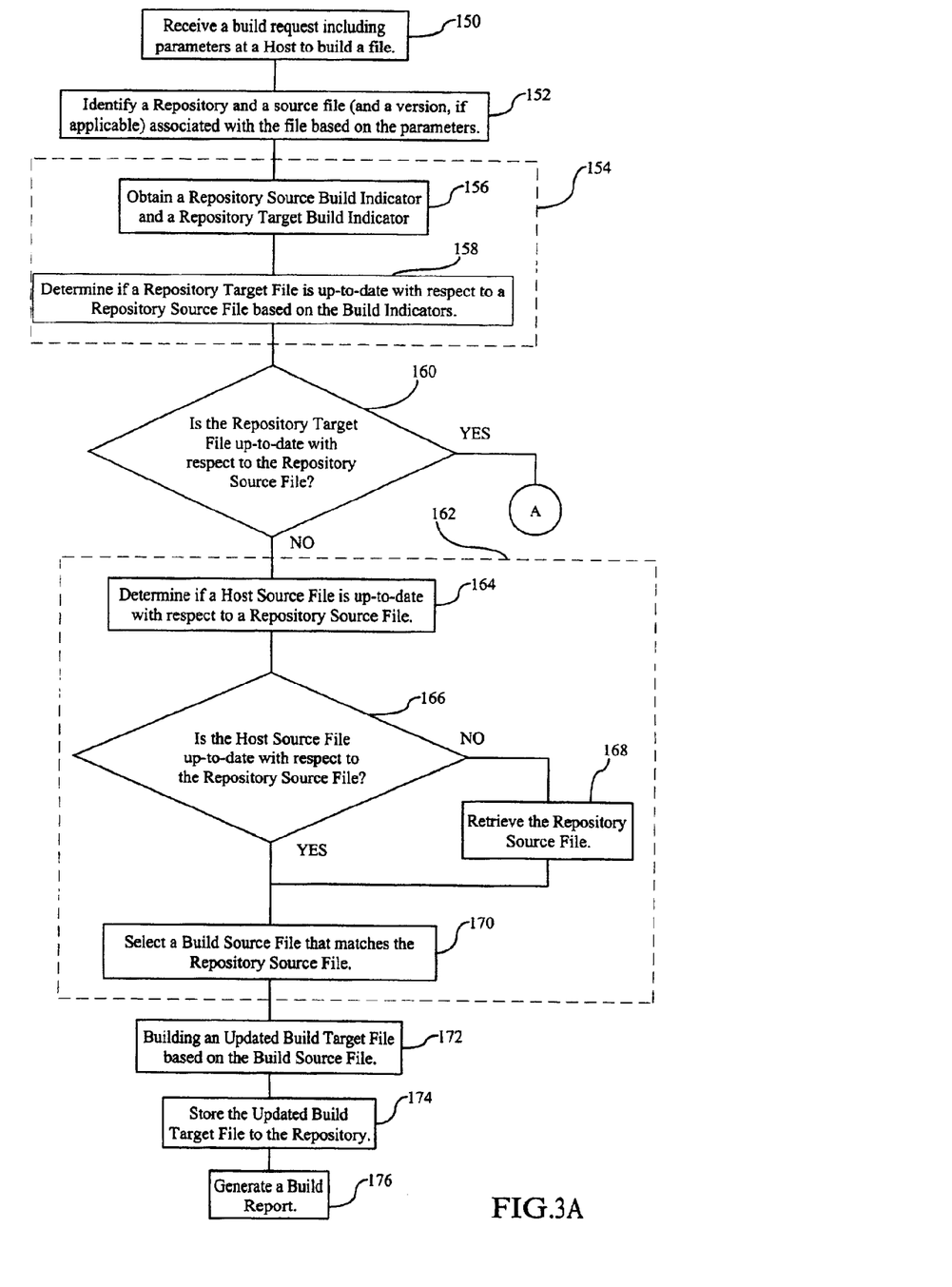
FIG. 3A is a flow chart of a build path in accordance with the present invention.

In use, the build environment 100 depicted in FIG. 2 may be used to perform the steps depicted in FIGS. 3A and 3B described below.

At step 150, a build request to build a file is received at the host. The build request includes parameters such as a repository indicator (e.g., an IP address) for identifying the name and location of a repository associated with the file, and a source file name for identifying the name of a source file associated with the file. A suitable manner for including parameters with the build request will be readily apparent to those skilled in the art. The build request may be received from content developers or a build administrator using HTTP or WebDAV. The build request is then routed to the build servlet, which invokes the build utility. In certain embodiments, the parameters may include versioning information for identifying the correct version of the target file. For example, a source file and a target file in accordance with WebDAV will each contain versioning information that can be used to identify a specific version of the source file and the target file, respectively.

At step 152, a repository associated with the file and a source file on which the file is dependent is identified based on the parameters. For example, the repository may be identified by obtaining the repository indicator from the parameters associated with the build request using known programming techniques that will be readily apparent to those skilled in the art. In addition, the source file may be identified by obtaining its name from the parameters using known techniques. In a preferred embodiment, the name of the source file is included in a known makefile, which resides on the repository, and the name of the makefile is included within the parameters. The source file is then identified by retrieving the makefile from the repository and examining its contents in a known manner. Also, a version associated with the target file may be identified by obtaining a version indicator, if available, from the parameters associated with the build request using known programming techniques.

At step 154, a determination is made as to whether an existing repository target file on the repository is up-to-date with respect to a repository source file on the repository. Generally, if the existing repository target file would result from using the existing repository source file in a build, the repository target file is up-to-date. Otherwise, the repository target file is not up-to-date. If the repository target file does not exist, it is treated as if it is not up-to-date. In determining if the existing repository target file is up-to-date, the existing repository target file is compared to the repository source file because the repository source file is deliberately created and updated in the repository by the content developers and, therefore, is presumed to be the file that the content developers want the target file based upon.

The general determination process of step 154 can be performed using steps 156 and 158 described below. At step 156, a repository source build indicator and a repository target build indicator, if available, are obtained. The repository source build indicator is a build indicator associated with a source file located at the repository and the repository target build indicator is a build indicator associated with a target file located at the repository. The build indicator may be a file time stamp, a WebDAV time stamp, or essentially any indicator capable of identifying when a file was created or built.

In a preferred embodiment, when a build is performed, the build indicators of the target file, and the source file used to create the target file, are set to a common value and stored with their respective files according to the WebDAV protocol. Therefore, the build indicators identify a particular build of the source and target files. In an alternative embodiment, the time stamps for the files, which indicate when they were created or last updated, may be used as their build indicators. The time stamps may be stored as WebDAV properties to facilitate retrieval over the Web.

The build indicators may be retrieved according to the WebDAV protocol without retrieving the actual files. For example, if the build indicator is a time stamp in accordance with the WebDAV protocol, a WebDAV command such as the "GET" command can be used to retrieve the time stamp only over the Web. The implementation of the WebDAV protocol to obtain a build indicator will be readily apparent to those skilled in the art.

WebDAV provides an efficient way to retrieve build indicators associated with source files and target files residing on the repository from the repository to the host without transferring the actual source and target files. It is contemplated that other methods may be used to retrieve the build indicators without the need to transfer the actual source and target file. Such methods will be readily apparent to those skilled in the art and are within the scope of the present invention.

At step 158, a determination is made as to whether the repository target file, if available, is up-to-date with respect to the repository source file. In determining if the repository target file is up-to-date, the repository target build indicator is compared to the repository source build indicator. If the repository target file does not exist, it is treated as if it is not up-to-date.

In the preferred embodiment, discussed above in reference to step 156, the build indicators of a target file, and a source file used to create the target file, are set to a common value when a build is performed. Thus, if the repository target build indicator is the same as the repository source build indicator, this indicates that the repository target file is the result of using the repository source file to build the repository target file. Therefore, the repository target file is up-to-date with respect to the repository source file if their respective build indicators are the same; otherwise, the repository target file is not up-to-date with respect to the repository source file. Accordingly, in the preferred embodiment, to be considered up-to-date, the repository target build indicator must match the repository source build indicator even if the repository target file was built more recently than the repository source file was created or last updated. This allows content developers to revert to a previous repository source file and have builds performed using that file.

In an alternative embodiment, discussed above in reference to step 156, the build indicators are time stamps indicating when a source file was created or last updated and indicating when a target file was built. If the repository target file has a time stamp which is more recent than the repository source file, this indicates that the repository target file is the result of using the repository source file to build the repository target file. Therefore, the repository target file is up-to-date with respect to the repository source file if the time stamp of the repository target file is more recent than the time stamp of the repository source file; otherwise the repository target file is not up-to-date with respect to the repository source file. This embodiment, presupposes that content developers will not revert to a previous repository source file.

At step 160, if the repository target file is not up-to-date with respect to the repository source file (indicating that building the repository source file will result in a target file that is different from the repository target file), processing proceeds through a set of selection steps 162 and a build will be performed. However, if the repository target file is up-to-date with respect to the repository source file (indicating that building the repository source file will result in a target file being built that is identical to the repository target file and, therefore, that building a target file from the repository source file would be redundant), processing proceeds through the steps described in reference to FIG. 3B and an unnecessary build is not performed.

At step 162, a build source file for building an updated build target file will be selected from either a host source file residing on the host, if available, or the repository source file residing on the repository. Generally, if the repository source file and the host source file are identical, the host source file is selected as the build source file; and, if the repository source file and the host source file are different or the host source file does not exist, the repository source file is selected as the build source file. Conceptually, the existing repository source file is selected as the build source file if the source files are different because the repository source file, as discussed above, is presumably the file from which the content developers want the target file built; and the host source file is selected as the build source file if the source files are identical because the host source file, which is equivalent to the repository source file, already exists on the host, and, therefore, does not have to be retrieved from the repository, thus conserving network resources.

The general selection step 162 can be performed using steps 164 through 170. At step 164, a determination is made as to whether the host source file is up-to-date with respect to the repository source file. In one embodiment, the repository source build indicator is compared to a host source build indicator associated with a host source file, if available, to determine if the host source file is up-to-date with respect to the repository source file. If the build indicators are time stamps indicating when a source file was created or last updated, the host source file is up-to-date with respect to the repository source file if the time stamp of the host source file matches the time stamp of the repository source file; otherwise the host source file is not up-to-date with respect to the repository source file. If the host source file does not exist, it is treated as if it is not up-to-date.

The build indicators facilitate the determination as to whether the host source file is the same as the repository source file. Accordingly, it is contemplated that the build indicators may be an indication other than a time stamp, such as file size (e.g., number of bytes), lines of program code, or essentially any feature that could be used to distinguish one file from another. For example, if the file sizes of the repository source file and the host source file are different, the host source file is not up-to-date with respect to the repository source file. Other means for distinguishing will be readily apparent to those skilled in the art and are considered within the spirit and scope of the present invention.

At step 166, the determination in step 164 is used to direct processing. If the host source file is not up-to-date (indicating that the host source file is different from the repository source file), processing proceeds at step 168. If the host source file is up-to-date (indicating that the host source file is the same as the repository source file), processing proceeds at step 170.

At step 168, the repository source file is retrieved from the repository to the host. The repository source file may be retrieved over the Web using a HTTP or WebDAV "GET" command. In certain embodiments, the retrieved repository source file will overwrite the existing host source file. If WebDAV protocols are used, a version indicator associated with a particular version of the repository source file may be transferred along with the repository source file over the Web. With versioning, a repository source file of one version will not overwrite another version of the repository source file on the host.

At step 170, a build source file is selected. The selected build source file is a file that matches the repository source file, and may be the repository source file itself. The host source file will be selected as the build source file if the host source file is up-to-date with respect to the repository source file. If the host source file is not up-to-date, the repository source file retrieved in step 168 is selected as the build source file. If the repository source file is retrieved in step 168 and overwrites the existing host source, the repository source file is selected by selecting the source file currently available at the host. In one embodiment, the repository source file is selected as the build source file if the repository source build indicator is different from the host source build indicator, otherwise, the host source file is selected.

At step 172, the build utility, using the build tools, builds an updated build target in a known manner based on the build source selected in selection steps 170.

At step 174, the updated build target file built in step 172 is stored to the repository. The updated build target file may be stored to the repository using a known HTTP or WebDAV "PUT" command. In certain embodiments, the updated build target file will overwrite the existing repository build target. If versioning is used, however, an updated build target file will not overwrite a build target of another version on the repository. With versioning, the WebDAV "CHECKIN" command may be used in addition to the "PUT" command.

At step 176, a build report is generated by the build utility. The build report contains information about the build performed by the build utility. The build output file may be stored in the file system as a Web displayable file, such as an extensible mark-up language (XML) file, that is accessible by the content developers. The type of information displayed in the build report may be designated by the build administrator and may be of a type well known to those skilled in the art.

Figure 3B:
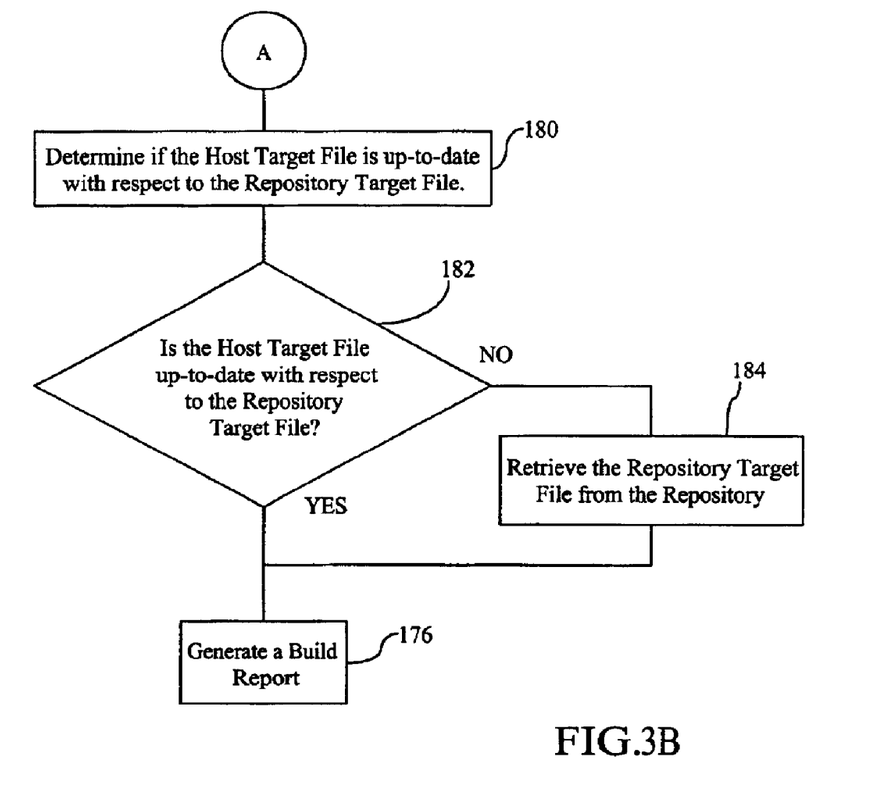
FIG. 3B is a flow chart of a non-build path in accordance with the present invention.

FIG. 3B is a flow chart of a non-build path containing steps performed by the build utility if the repository target file is up-to-date with respect to the repository source file (indicating that building the repository source file will result in a target file identical to the existing repository target file).

At step 180, a determination is made as to whether the host target file is up-to-date with respect to the repository target file. For example, the repository target build indicator can be compared to a host target build indicator associated with a host target file, if available, to determine if the host target file is up-to-date respect to the repository target file. If the build indicators are time stamps indicating when a target file was built, the host target file is up-to-date with respect to the repository target file if the time stamp of the host target file matches the time stamp of the repository target file; otherwise the host target file is not up-to-date with respect to the repository target file. If the host target file does not exist, it is treated as if it is not up-to-date.

The build indicators facilitate the determination as to whether the host target file is the same as the repository target file. Accordingly, it is contemplated that the build indicators may be an indication other than a time stamp, such as discussed above in reference to the use of build indicators in determining if the host source file is the same as the repository source file.

At step 182, if the host target file is not up-to-date (indicating that the host target file is different from the repository target file), processing proceeds through step 184. If the host target file is up-to-date (indicating that the repository target file is the same as the host target file), step 184 is not performed.

At step 184, the repository target file is retrieved from the repository to the host. The repository target file may be retrieved in the same manner as the repository source file in step 168. In certain embodiments, the retrieved repository target file will overwrite the existing host target file, thereby insuring that the host target file is up-to-date. If versioning is used, however, a retrieved repository target file of one version will not overwrite a host target file of another version.

At step 176, a build report is generated as described above. Since a build was not performed, the build report may state that a build was not performed.

As discussed above, in accordance with certain embodiments, a makefile is used in the present invention to identify a source file on which the target file is dependent. The makefile may additionally identify other files, such as an object file, on which the source file is dependent. If the source file is dependent on another file (that has changed), the source file should be built using the file on which it depends before the target file is built using the source file. It will be readily apparent to those skilled in the art that the steps of the present invention can be applied in a reiterative fashion to build all dependancy files prior to building the target file.

Network

Figure 4:
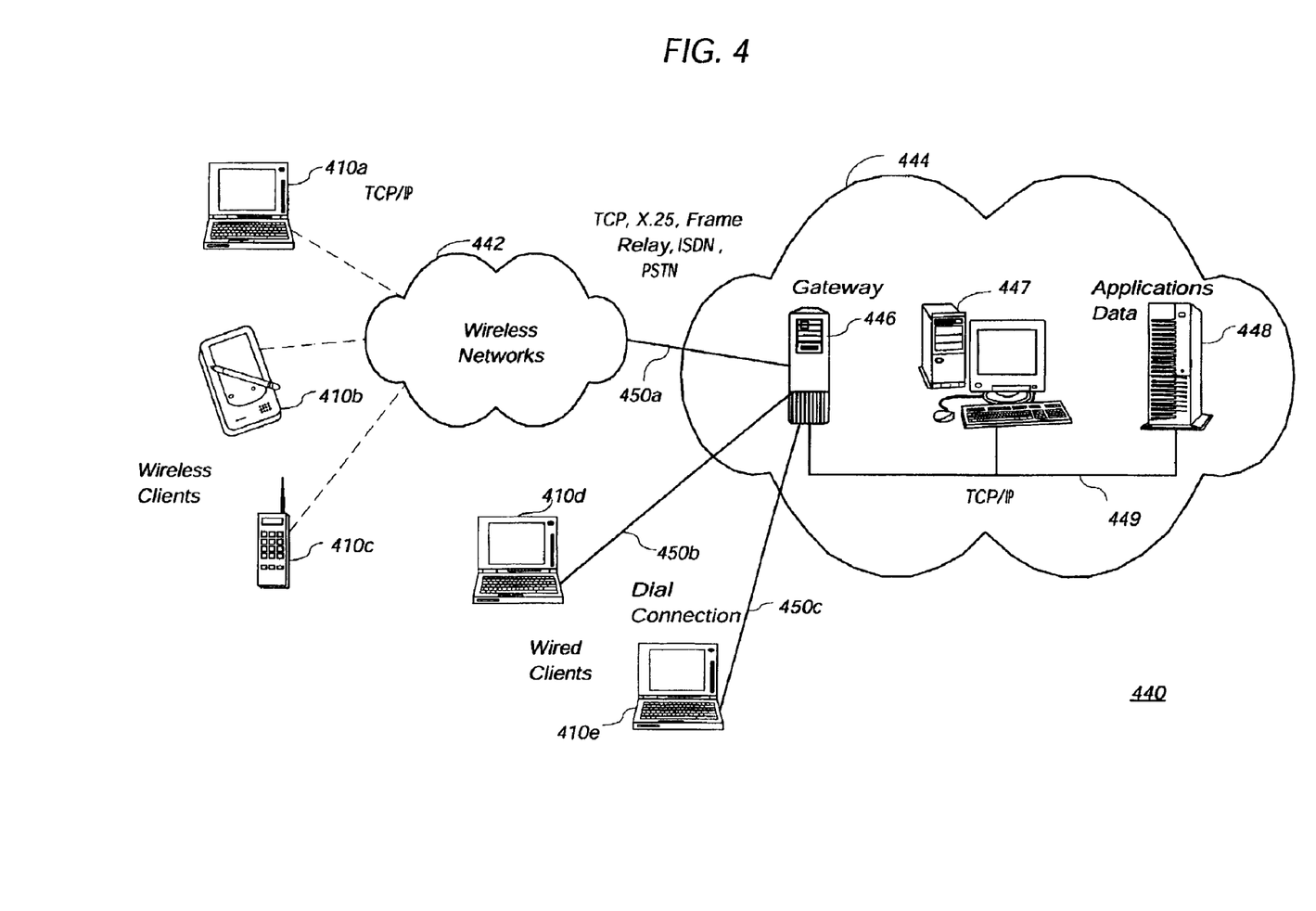
FIG. 4 is a block diagram illustrating an exemplary data processing network in which the present invention may be practiced.

FIG. 4 illustrates an exemplary data processing network 440 in which the present invention may be practiced. The data processing network 440 may include a plurality of individual networks, such as wireless network 442 and network 444, each of which may include a plurality of individual workstations/devices, e.g. 410a, 410b, 410c. Additionally, as those skilled in the art will appreciate, one or more LANs may be included (not shown), where a LAN may comprise a plurality of intelligent workstations coupled to a host processor.

The networks 442 and 444 may also include mainframe computers or servers, such as a gateway computer 446 or application server 447 (which may access a data repository 448).

A gateway computer 446 serves as a point of entry into each network 444. The gateway computer 446 may be preferably coupled to another network 442 by means of a communications link 450a. The gateway computer 446 may also be directly coupled to one or more workstations, e.g., 410d, 410e, using a communications link 450b, 450c. The gateway computer 446 may be implemented using any appropriate processor, such as IBM's Network Processor. For example, the gateway computer 446 may be implemented using an IBM pSeries (RS/6000) or xSeries (Netfinity) computer system, an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390," "Application System/400," and "AS/400" are registered trademarks of IBM.) These are merely representative types of computers with which the present invention may be used.

The gateway computer 446 may also be coupled 449 to a storage device (such as data repository 448). Further, the gateway 446 may be directly or indirectly coupled to one or more workstations/devices 410d, 410e, and servers such as application server 447.

Those skilled in the art will appreciate that the gateway computer 446 may be located a great geographic distance from the network 442, and similarly, the workstations/devices may be located a substantial distance from the networks 442 and 444. For example, the network 442 may be located in California, while the gateway 446 may be located in Texas, and one or more of the workstations/devices 410 may be located in New York. The workstations/devices 410 may connect to the wireless network 442 using a networking protocol such as the Transmission Control Protocol/Internet Protocol ("TCP/IP") over a number of alternative connection media, such as cellular phone, radio frequency networks, satellite networks, etc. The wireless network 442 preferably connects to the gateway 446 using a network connection 450a such as TCP or UDP (User Datagram Protocol) over IP, X.25, Frame Relay, ISDN (Integrated Services Digital Network), PSTN (Public Switched Telephone Network), etc. The workstations/devices 410 may alternatively connect directly to the gateway 446 using dial connections 450b or 450c. Further, the wireless network 442 and network 444 may connect to one or more other networks (not shown), in an analogous manner to that depicted in FIG. 4.

The present invention may be used on a client computer or server in a networking environment, or on a standalone workstation. (Note that references herein to client and server devices are for purposes of illustration and not of limitation: the present invention may also be used advantageously with other networking models.) When used in a networking environment, the client and server devices may be connected using a "wireline" connection or a "wireless" connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The workstation or client computer may be any type of computer processor, including laptop, handheld or mobile computers; vehicle-mounted devices; desktop computers; mainframe computers; etc., having processing (and, optionally, communication) capabilities. The server, similarly, can be one of any number of different types of computer which have processing and communication capabilities. These techniques are well known in the art, and the hardware devices and software which enable their use are readily available.

Processing Device

Figure 5:
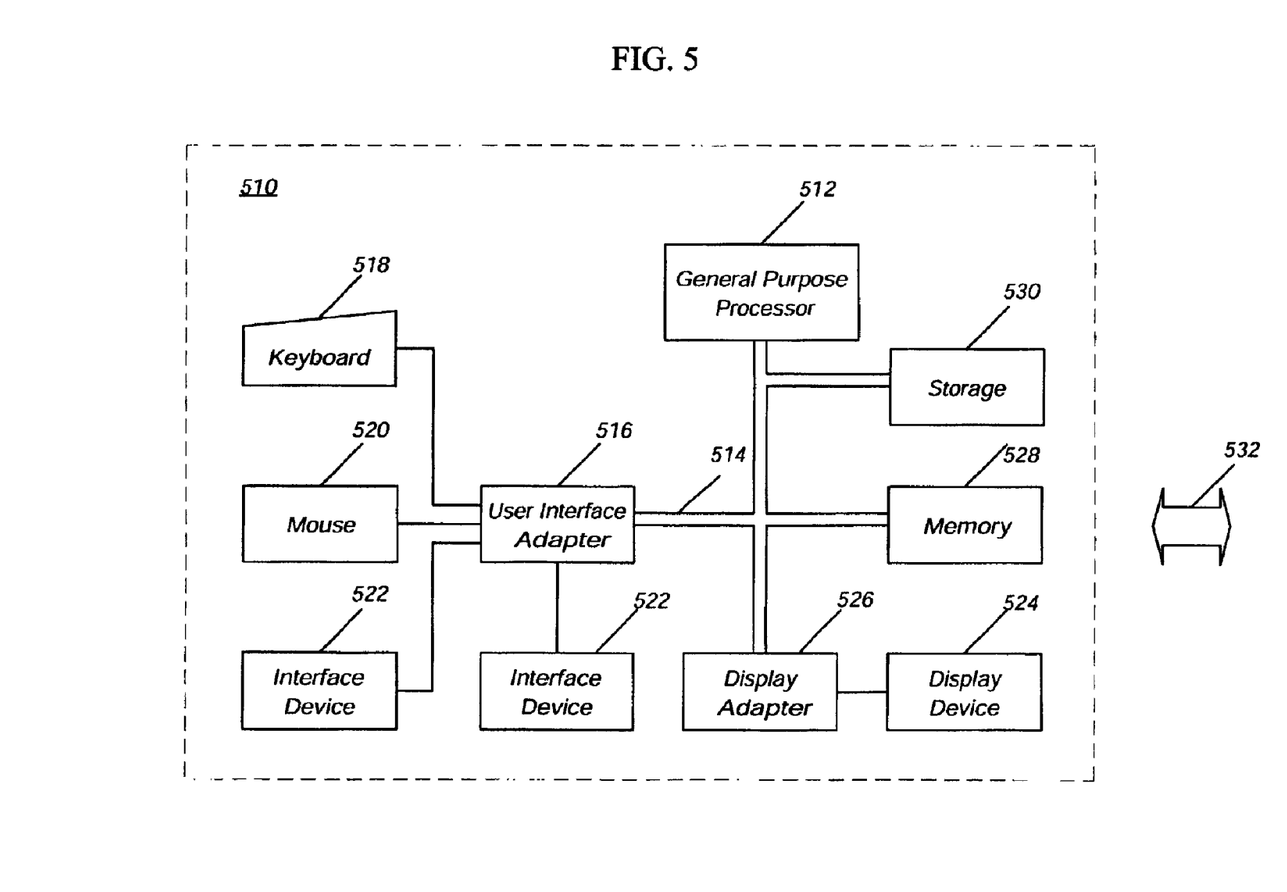
FIG. 5 is a block diagram of a processing device in which the present invention may be practiced.

FIG. 5 is a block diagram of a processing device 510 in accordance with the present invention. The exemplary processing device 510 is representative of workstation 410a or server 446 of FIG. 4, as discussed above. This block diagram represents hardware for a local implementation or a remote implementation.

As is well known in the art, the workstation of FIG. 5 includes a representative processing device, e.g. a single user computer workstation 510, such as a personal computer, including related peripheral devices. The workstation 510 includes a general purpose microprocessor 512 and a bus 514 employed to connect and enable communication between the microprocessor 512 and the components of the workstation 510 in accordance with known techniques. The workstation 510 typically includes a user interface adapter 516, which connects the microprocessor 512 via the bus 514 to one or more interface devices, such as a keyboard 518, mouse 520, and/or other interface devices 522, which can be any user interface device, such as a touch sensitive screen, digitized entry pad, etc. The bus 514 also connects a display device 524, such as an LCD screen or monitor, to the microprocessor 512 via a display adapter 526. The bus 514 also connects the microprocessor 512 to memory 528 and long-term storage 530 (collectively, "memory") which can include a hard drive, diskette drive, tape drive, etc.

The workstation 510 may communicate with other computers or networks of computers, for example, via a communications channel or modem 532. Alternatively, the workstation 510 may communicate using a wireless interface at 532, such as a CDPD (cellular digital packet data) card. The workstation 510 may be associated with such other computers in a LAN or a wide area network (WAN), or the workstation 510 can be a client in a client/server arrangement with another computer, etc. All of these configurations, as well as the appropriate communications hardware and software, are known in the art.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. In a computer system having a repository and a host for accommodating source and target files, a computer implemented method for building a file at the host, said method comprising the steps of:

determining if a repository target file is up-to-date with respect to a repository source file on the repository, said repository source file and said repository target file corresponding to the file, said determining step comprising at least the steps of:
obtaining a repository source build indicator associated with said repository source file and a repository target build indicator associated with said repository target file; and
determining if said repository target file is up-to-date with respect to said repository source file based on said repository source build indicator and said repository target build indicator;

if said repository target file is not up-to-date with respect to the repository source file:
identifying as a build source file a source file that matches said repository source file, said identifying step comprising at least the step of:
selecting said build source file from either a host source file residing on the host or said repository source file residing on said repository, said selection based on said repository source build indicator and a host source build indicator associated with said host source file; and
building an updated build target file at the host based on said build source file; wherein said selecting step comprises at least the steps of:
determining if said host source file is up-to-date with respect to said repository source file based on said repository source build indicator and said host source build indicator;
retrieving said repository source file from said repository if said host source file is not up-to-date; and
selecting said retrieved repository source file if retrieved, otherwise selecting said host source file.

2. The method of claim 1, wherein said host source file is up-to-date with respect to said repository source file if said host source build indicator is the same as said repository source build indicator.

3. The method of claim 1, further comprising the steps of:
if said repository target file is up-to-date with respect to said repository source file:
determining if a host target file is up-to-date with respect to said repository target file based on said repository target build indicator and a host target build indicator associated with said host target file; and
retrieving said repository target file from said repository if said host target file is not up-to-date.

4. The method of claim 3, wherein said host target file is up-to-date with respect to said repository target file if said host target build indicator is the same as said repository target build indicator.

5. The method of claim 1, further comprising the steps of: receiving a build request at the host, said build request including parameters; and identifying said repository based on said parameters.

6. The method of claim 5, wherein said build request is generated through a Web browser.

7. The method of claim 5, further comprising the step of:
identifying a version associated with the file based on said parameters;
wherein said repository target's version and said repository source's version match said identified version.

8. The method of claim 1, further comprising the step of: storing said updated build target file to said repository.

9. The method of claim 1, further comprising the step of: generating a build report in a Web displayable format.

10. In a computer system having a repository and a host for accommodating source and target files, a computer implemented method for building a file at the host, said method comprising the steps of:
  receiving a build request at the host, said build request including parameters;
  identifying a repository and a repository source file based on said parameters;
  determining if a repository target file is up-to-date with respect to said repository source file, said repository source file and said repository target file corresponding to the file, said determining step comprising at least the steps of:
    obtaining a repository source build indicator associated with said repository source file and a repository target build indicator associated with said repository target file; and
    determining if said repository target file is up-to-date with respect to said repository source file based on said repository source build indicator and said repository target build indicator;
  if said repository target file is not up-to-date with respect to the repository source file:
    identifying as a build source file a source file that matches said repository source file, said identifying step comprising at least the steps of:
      selecting said build source file from either a host source file residing on the host or said repository source file residing on said repository, said selection based on said repository source build indicator and a host source build indicator associated with said host source file, said selecting step comprising at least the steps of:
        determining if said host source file is up-to-date with respect to said repository source file based on said repository source build indicator and said host source build indicator;
        retrieving said repository source file from said repository if said host source file is not up-to-date; and
        selecting said retrieved repository source file if retrieved, otherwise selecting said host source file;
    building an updated build target file at the host based on said build source file; and
    storing said updated build target file to said repository.

11. The method of claim 10, further comprising the steps of:
  if said repository target file is up-to-date with respect to said repository source file;
    determining if a host target file is up-to-date with respect to said repository target file based on said repository target build indicator and a host target build indicator associated with said host target file; and
    retrieving said repository target file from said repository if said host target file is not up-to-date.

12. A computer system having a repository and a host for building a file at the host, said system accommodating source and target files, said system comprising:
  means for determining if a repository target file is up-to-date with respect to a repository source file on the repository, said repository source file and said repository target file corresponding to the file, said determining means comprising at least;
    means for obtaining a repository source build indicator associated with said repository source file and a repository target build indicator associated with said repository target file; and
    means for determining if said repository target file is up-to-date with respect to said repository source file based on said repository source build indicator and said repository target build indicator;
  means for identifying as a build source file a source file that matches said repository source file if said repository target file is not up-to-date with respect to the repository source file, wherein said identifying means comprising at least:
    means for selecting said build source file from either a host source file residing on the host or said repository source file residing on said repository, said selection based on said repository source build indicator and a host source build indicator associated with said host source file, said selecting means comprising at least:
      means for determining if said host source file is up-to-date with respect to said repository source file based on said repository source build indicator and said host source build indicator;
      means for retrieving said repository source file from said repository if said host source file is not up-to-date; and
      means for selecting said retrieved repository source file if retrieved, otherwise selecting said host source file; and
  means for building an updated build target file at the host based on said build source file if said repository target file is not up-to-date with respect to the repository source file.

13. The system of claim 12, further comprising:
  means for determining if a host target file is up-to-date with respect to said repository target file based on said repository target build indicator and a host target build indicator associated with said host target file if said repository target file is up-to-date with respect to said repository source file; and
  means for retrieving said repository target file from said repository if said host target file is not up-to-date and said repository target file is up-to-date with respect to said repository source file.

14. A computer program product for use in a computer system comprising a repository and a host to build a file at the host, said system accommodating source and target files, said computer program product comprising:
  computer storage program code embodied in a computer readable medium, the computer readable program code comprising at least:
  computer readable program code for determining if a repository target file is up-to-date with respect to a repository source file on the repository, said repository source file and said repository target file corresponding to the file, said computer readable program code for determining comprising at least:
    computer readable program code for obtaining a repository source build indicator associated with said repository source file and a repository target build indicator associated with said repository target file; and
    computer readable program code for determining if said repository target file is up-to-date with respect to said repository source file based on said repository source build indicator and said repository target build indicator;
  computer readable program code for identifying as a build source file a source file that matches said repository source file if said repository target file is not up-to-date with respect to the repository source file, said computer readable program code for identifying comprising at least:

computer readable program code for selecting said build source file from either a host source file residing on the host or said repository source file residing on said repository, said selection based on said repository source build indicator and a host source build indicator associated with said host source file, said computer readable program code for selecting comprising at least:

computer readable program code for determining if said host source file is up-to-date with respect to said repository source file based on said repository source build indicator and said host source build indicator;

computer readable program code for retrieving said repository source file from said repository if said host source file is not up-to-date; and computer readable program code for selecting said retrieved repository source file if retrieved, otherwise selecting said host source file; and computer readable program code for building an updated build target file at the host based on said build source file if said repository target file is not up-to-date with respect to the repository source file.

15. The product of claim 4, further comprising:

computer readable program code for determining if a host target file is up-to-date with respect to said repository target file based on said repository target build indicator and a host target build indicator associated with said host target file if said repository target file is up-to-date with respect to said repository source file; and computer readable program code for retrieving said repository target file from said repository if said host target file is not up-to-date and said repository target file is up-to-date with respect to said repository source file.

* * * * *

UNITED STATES PATENT AND TRADEMARK OFFICE
CERTIFICATE OF CORRECTION

PATENT NO. : 6,948,163 B2
DATED : September 20, 2005
INVENTOR(S) : Melahn et al.

It is certified that error appears in the above-identified patent and that said Letters Patent is hereby corrected as shown below:

Column 14,
Line 45, should read as follows:
-- storage medium, the computer readable program code --.

Column 16,
Line 5, should read as follows:
-- The product of claim 14, further comprising: --.

Signed and Sealed this

Tenth Day of January, 2006

JON W. DUDAS
*Director of the United States Patent and Trademark Office*